United States Patent
Maeda et al.

(10) Patent No.: US 8,394,913 B2
(45) Date of Patent: *Mar. 12, 2013

(54) METHOD FOR PRODUCING POLYPHENYLENE ETHER

(75) Inventors: Mutsumi Maeda, Tokyo (JP); Hiroaki Furukawa, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/397,304

(22) Filed: Feb. 15, 2012

(65) Prior Publication Data

US 2012/0149865 A1 Jun. 14, 2012

Related U.S. Application Data

(63) Continuation of application No. 12/937,427, filed as application No. PCT/JP2009/057654 on Apr. 16, 2009.

(30) Foreign Application Priority Data

Apr. 18, 2008 (JP) .................................. 2008-108642
Apr. 18, 2008 (JP) .................................. 2008-108643

(51) Int. Cl.
 *C08G 65/40* (2006.01)
 *C08G 64/00* (2006.01)
(52) U.S. Cl. ......................................... 528/211; 521/41
(58) Field of Classification Search .................... 521/41; 528/211
See application file for complete search history.

(56) References Cited

U.S. PATENT DOCUMENTS

| 3,306,875 | A | 2/1967 | Hay |
| 3,344,116 | A | 9/1967 | Borman |
| 3,432,466 | A | 3/1969 | Hay |
| 3,838,102 | A | 9/1974 | Bennett et al. |
| 3,988,297 | A | 10/1976 | Bennett et al. |
| 4,042,564 | A | 8/1977 | Bennett et al. |
| 4,058,504 | A | 11/1977 | Yonemitsu et al. |
| 4,092,294 | A | 5/1978 | Bennett et al. |
| 4,140,675 | A | 2/1979 | White |
| 4,234,706 | A | 11/1980 | White |
| 4,477,651 | A | 10/1984 | White et al. |
| 2009/0081462 | A1 | 3/2009 | Miyoshi et al. |
| 2009/0212264 | A1 | 8/2009 | Maeda |
| 2009/0283724 | A1 | 11/2009 | Maeda |
| 2010/0173139 | A1 | 7/2010 | Miyoshi et al. |

FOREIGN PATENT DOCUMENTS

| CN | 1435439 A | 8/2003 |
| GB | 1 497 293 | 1/1978 |
| JP | 36-018692 | 10/1961 |
| JP | 51-122196 | 10/1976 |
| JP | 52-017075 | 5/1977 |
| JP | 52-017076 | 5/1977 |
| JP | 54-033594 | 3/1979 |
| JP | 54-033595 | 3/1979 |
| JP | 58-053012 | 11/1983 |
| JP | 59-22736 | 5/1984 |
| JP | 59-023332 | 6/1984 |
| JP | 59-131627 | 7/1984 |
| JP | 59-179620 | 10/1984 |
| JP | 60-042422 | 3/1985 |
| JP | 60-051720 | 3/1985 |
| JP | 61-001453 | 1/1986 |
| JP | 61-37290 | 8/1986 |
| JP | 2000-281774 | 10/2000 |
| JP | 2000-281775 | 10/2000 |
| JP | 2002-003596 | 1/2002 |
| JP | 2004-504429 | 2/2004 |
| WO | 83/03833 A1 | 11/1983 |
| WO | 02/06376 | 1/2002 |

OTHER PUBLICATIONS

International Search Report for PCT/JP2009/057654, mailed Jun. 23, 2009.
English language Abstract for EP 0111722, corresponding to JP 59-131627 published Jul. 28, 1984.
English language Abstract for EP 0131243, corresponding to JP 60-051720 published Mar. 23, 1985.
Chinese Office action that issued with respect to patent family member Chinese Patent Application No. 200980113293.1, mail date is Feb. 16, 2012, with translation.
Singapore Office Action, Written Opinion, and Search Report issued with respect to related Singapore Application No. 201007625-5, dated Jun. 29, 2012.

*Primary Examiner* — Terressa Boykin
(74) *Attorney, Agent, or Firm* — Greenblum & Bernstein, P.L.C.

(57) ABSTRACT

Method for producing polyphenylene ether, comprising preparing a polymerization solution of 10-25 parts by mass of a phenolic compound (M) and 75-90 parts by mass of an aromatic solvent (A) with the total of the compound and the solvent being 100 parts by mass, and 0.1-10 parts by mass of a catalyst (C) containing a metal salt; performing oxidative polymerization of the phenolic compound (M) by passing oxygen-containing gas through polymerization solution; stopping polymerization by mixing aqueous chelating agent solution into polymerization solution; subjecting a diphenoquinone compound produced as a by-product to quinone binding process or removal by reduction; and obtaining polyphenylene ether by separating aqueous phase through liquid-liquid separation. In the method for producing a polyphenylene ether, 0.001-0.004 part by weight of an ion catalyst (D) is added into the polymerization solution before the liquid-liquid separation.

6 Claims, No Drawings

METHOD FOR PRODUCING POLYPHENYLENE ETHER

CROSS-REFERENCE TO RELATED APPLICATIONS

This application is a continuation of application Ser. No. 12/937,427 which is a national stage of PCT/JP2009/057654, filed Apr. 16, 2009, which claims priority to Japanese Application No. 2008-108642, filed Apr. 18, 2008, and Japanese Application No. 2008-108643, filed Apr. 18, 2008. The disclosures of application Ser. Nos. 12/937,427 and PCT/JP2009/057654 are incorporated by reference herein in their entireties.

TECHNICAL FIELD

The present invention relates to a novel method for producing a polyphenylene ether. Particularly, the present invention relates to a method for producing a polyphenylene ether, comprising: passing an oxygen-containing gas through a polymerization solution comprising; a good solvent, a metal salt and an amine compound as catalyst components, and a phenol compound to oxidative polymerize the phenol compound to obtain a polyphenylene ether, then mixing a chelating agent in the polymerization solution to terminate the polymerization, separating the metal salt, the chelating agent and water from the polymerization solution to obtain a polyphenylene ether solution, and thereafter adding a poor solvent for the polyphenylene ether solution to precipitate a polyphenylene ether particle to produce the polyphenylene ether, wherein the metal salt, the chelating agent and water are effectively separated to obtain the polyphenylene ether excellent in color tone and mechanical properties.

BACKGROUND ART

Various methods have conventionally been disclosed regarding methods for producing a polyphenylene ether by oxidative polymerization of a phenolic compound.

Patent Documents 1 to 4 disclose, as catalysts effective for oxidative polymerization of phenolic compounds, a catalyst in combination of a copper compound and an amine, a catalyst in combination of a copper compound and a halogen compound, a catalyst using a primary amine, a secondary amine, a tertiary amine, a monoamine, a diamine or a polyamine, and a catalyst using a tetraalkyl-type diamine such as N,N,N',N'-tetramethyl-1,4-butanediamine.

Patent Documents 5 and 6 disclose, as catalysts effective for the oxidative polymerization, a catalyst in combination of a copper compound, an iodine compound and a tetraalkyl-type diamine.

Patent Documents 7 to 9 disclose a catalyst in combination of a copper compound, a bromine compound, and a tertiary amine such as N,N'-di-t-butylethylenediamine or n-butyldimethylamine, and a catalyst in combination of a copper compound, a bromine compound, a tertiary amine and a secondary monoamine.

Patent Document 10 discloses a catalyst composed of a copper compound and a secondary aliphatic amine or a secondary aliphatic amine, an aniline having a special structure and N,N,N',N'-tetramethyl-1,3-diaminopropane, and improved in water resistance.

Patent Documents 8 to 10 further describe that the use of a quaternary ammonium compound is advantageous.

Patent Documents 11 to 13 disclose that the blending of a polymerization catalyst and a phenolic compound in an inert gas atmosphere highly activates the catalyst and improves the productivity of a polyphenylene ether.

Patent Documents 14 and 15 disclose, as a method for separating a polyphenylene ether and a polymerization catalyst after terminating the oxidative polymerization, a method of a continuous liquid-liquid separation using a centrifugal separator.

On the other hand, in the oxidative polymerization of a phenolic compound, diphenoquinone is produced as a by-product. Since the diphenoquinone affects physical properties and color tone of a polyphenylene ether, the diphenoquinone needs to be disposed.

Patent Document 16 discloses, as a method of disposing diphenoquinone, a reduction removal method, in which after an oxidative polymerization of a phenolic compound is completed, an aminocarboxylic acid derivative and a reducing agent are added to the polymerization solution to separate diphenoquinone from polyphenylene ether.

Patent Documents 17 and 18 also disclose, as a method of disposing diphenoquinone, a method of reacting diphenoquinone with a polyphenylene ether.

However, a polyphenylene ether is polymerized using a catalyst disclosed in Patent Documents 8 to 10 and diphenoquinone is disposed, then the catalyst is tried to be removed from a polymerization solution by the method disclosed in Patent Documents 14 and 15, the interface between a water phase and an organic solvent phase does not stabilize and bubbles when the liquid-liquid separation is carried out, and thus without measures such as discarding an interface portion, a metal salt as a polymerization catalyst component cannot be separated completely from the polyphenylene ether in some cases.

Furthermore, a polyphenylene ether is produced using a favorable catalyst described in Patent Documents 8 to 10, and the same method as described above is applied, although a metal salt as a polymerization catalyst component can be separated from the polyphenylene ether, the obtained polyphenylene ether has a problem in mechanical properties.

That is, no technique has been disclosed in which a metal salt as a polymerization catalyst component is efficiently separated from a polyphenylene ether having been subjected to diphenoquinone treatment, and a polyphenylene ether excellent in mechanical properties is obtained.

CITATION LIST

Patent Documents
Patent Document 1: JP 36-018692 B
Patent Document 2: U.S. Pat. No. 3,306,875
Patent Document 3: U.S. Pat. No. 3,344,116
Patent Document 4: U.S. Pat. No. 3,432,466
Patent Document 5: JP 52-017075 B
Patent Document 6: JP 52-017076 B
Patent Document 7: JP 58-053012 B
Patent Document 8: JP 59-023332 B
Patent Document 9: JP 59-131627 A
Patent Document 10: JP 60-042422 A
Patent Document 11: JP 59-179620 A
Patent Document 12: JP 61-001453 A
Patent Document 13: JP 2002-003596 A
Patent Document 14: JP 60-051720 A
Patent Document 15: JP 2004-504429 A
Patent Document 16: JP 51-122196 A
Patent Document 17: JP 54-033594 A
Patent Document 18: JP 54-033595 A

SUMMARY OF THE INVENTION

Problems to be Solved by the Invention

A method is demanded in which a metal salt as a polymerization catalyst component is efficiently separated from a polyphenylene ether, and a polyphenylene ether excellent in mechanical properties is obtained.

Means for Solving the Problems

As a result of studies on a technology to separate a polymerization catalyst component from a polymerization solution in a conventional oxidative polymerization of a phenolic compound, the present inventors have found a method for efficiently separating a metal salt as a polymerization catalyst component from a polyphenylene ether, and a method for obtaining a polyphenylene ether excellent in mechanical properties. This finding has led to the completion of the present invention.

That is, the present invention is as follows.

1. A method for producing a polyphenylene ether, comprising:

preparing a polymerization solution comprising 100 parts by mass in total of 10 to 25 parts by mass of a phenolic compound (M) and 75 to 90 parts by mass of an aromatic solvent (A), and 0.1 to 10 parts by mass of a catalyst (C) comprising a metal salt as a component;

passing an oxygen-containing gas through the polymerization solution to oxidative polymerize the phenolic compound (M);

mixing a chelating agent aqueous solution with the polymerization solution to terminate the polymerization;

subjecting a diphenoquinone compound produced as a by-product to quinone-coupling treatment or by a reduction removal; and thereafter, subjecting the polymerization solution to a liquid-liquid separation to separate a water phase to obtain the polyphenylene ether, wherein, 0.001 to 0.004 part by mass of an ion catalyst (D) is added to the polymerization solution before the liquid-liquid separation is carried out.

2. The method according to the above 1, wherein the ion catalyst (D) is added to the polymerization solution immediately before the liquid-liquid separation is carried out.

3. The method according to the above 1, wherein the ion catalyst (D) is added to the polymerization solution when the polymerization solution is prepared.

4. The method according to any one of the above 1 to 3, wherein the ion catalyst (D) is added in an amount of 0.001 to 0.003 part by mass.

5. The method according to any one of the above 1 to 4, wherein the ion catalyst (D) is a tetraalkylammonium salt compound represented by formula (4) shown below, or a polyethylene glycol group-containing alkylammonium salt compound represented by formula (5) shown below:

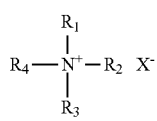

wherein $R_1$, $R_2$, $R_3$ and $R_4$ are each independently a linear or branched alkyl having 1 to 22 carbon atoms; and X is an anion as a counterion;

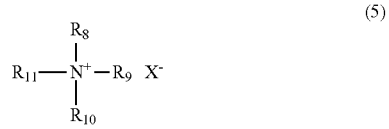

wherein $R_8$ and $R_9$ denote a straight chain or branched chain alkyl group having 1 to 22 carbon atoms; $R_{10}$ is a group defined as $R_8$, or a group represented by $—(CH_2CH_2O)_n—H$ (where n is an integer of 1 to 40); $R_{11}$ is a group represented by $—(CH_2CH_2O)_n—H$ (where n is an integer of 1 to 40); and X is an anion as a counterion.

6. The method according to any one of the above 1 to 5, wherein the ion catalyst (D) is trioctylmethylammonium chloride.

7. The method according to any one of the above 1 to 6, wherein a diphenoquinone compound produced as a by-product is subjected to quinone-coupling treatment after the chelating agent aqueous solution is mixed with the polymerization solution to terminate the polymerization.

8. The method according to any one of the above 1 to 7, wherein the oxygen-containing gas is an oxygen-containing gas having an oxygen concentration of 10 to 25% by volume.

9. The method according to any one of the above 1 to 8, further comprising using an oxygen-containing gas having an oxygen partial pressure of 0.0147 MPa or higher and 0.0883 MPa or lower, and controlling an absolute pressure of a reactor gas phase section to 0.098 MPa or higher and lower than 0.392 MPa.

Advantages of the Invention

The present invention can efficiently separate a metal salt as a polymerization catalyst component from a polyphenylene ether, and provide a polyphenylene ether excellent in mechanical properties.

MODE FOR CARRYING OUT THE INVENTION

The present invention will be described specifically hereinafter.

The polyphenylene ether according to the present invention includes a homopolymer or a copolymer having a repeating unit represented by formula (1) shown below.

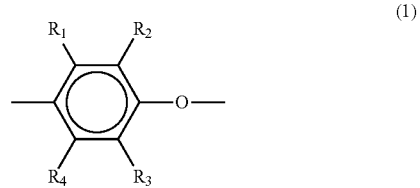

wherein $R_1$ and $R_4$ each independently denote a hydrogen atom, a primary or secondary lower alkyl group, a phenyl group, an aminoalkyl group, or a hydrocarbonoxy group; and $R_2$ and $R_3$ each independently denote a hydrogen atom, a primary or secondary lower alkyl group, or a phenyl group.

Specific examples of homopolymers of polyphenylene ether resins include poly(2,6-dimethyl-1,4-phenylene)ethers, poly(2-methyl-6-ethyl-1,4-phenylene) ethers, poly(2,6-diethyl-1,4-phenylene) ethers, poly(2-ethyl-6-n-propyl-1,4-phenylene) ethers, poly(2,6-di-n-propyl-1,4-phenylene) ethers, poly(2-methyl-6-n-butyl-1,4-phenylene) ethers, poly (2-ethyl-6-isopropyl-1,4-phenylene) ethers, poly(2-methyl-6-hydroxyethyl-1,4-phenylene) ethers and poly(2-methyl-6-chloroethyl-1,4-phenylene) ethers.

Above all, poly(2,6-dimethyl-1,4-phenylene) ethers are especially preferable.

The polyphenylene ether resin copolymers refer to copolymers containing a phenylene ether unit as a monomer unit. Specific examples thereof include copolymers of 2,6-dimethylphenol and 2,3,6-trimethylphenol, copolymers of 2,6-dimethylphenol and o-cresol, and copolymers of 2,6-dimethylphenol, 2,3,6-trimethylphenol and o-cresol.

The phenolic compound used in the present invention is a compound having a structure represented by formula (2) shown below.

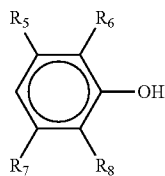

(2)

wherein $R_5$ and $R_7$ each independently denote a hydrogen atom, a primary or secondary lower alkyl group, a phenyl group, an aminoalkyl group, or a hydrocarbonoxy group; and $R_6$ and $R_8$ each independently denote a hydrogen atom, a primary or secondary lower alkyl group, or a phenyl group.

Examples of the compound include 2,6-dimethylphenol, 2,3,6-trimethylphenol, 2-methyl-6-ethylphenol, 2,6-diethylphenol, 2-ethyl-6-n-propylphenol, 2-methyl-6-chlorophenol, 2-methyl-6-bromophenol, 2-methyl-6-isopropylphenol, 2-methyl-6-n-propylphenol, 2-ethyl-6-bromophenol, 2-methyl-6-n-butylphenol, 2,6-di-n-propylphenol, 2-ethyl-6-chlorophenol, 2-methyl-6-phenylphenol, 2,6-diphenylphenol, 2,6-bis-(4-fluorophenyl)phenol, 2-methyl-6-tolylphenol and 2,6-ditolylphenol. These compounds may be used singly or concurrently in two or more thereof. Small amounts of phenol, o-cresol, m-cresol, p-cresol, 2,4-dimethylphenol, 2-ethylphenol, and the like are substantially allowed to be contained.

Among these phenolic compounds, 2,6-dimethylphenol, or a mixture of 2,6-dimethylphenol and 2,3,6-trimethylphenol are preferable, and 2,6-dimethylphenol is especially preferable.

The aromatic solvent used in the present invention is not especially limited, but is an aromatic solvent which dissolves a phenolic compound having a low molecular weight, and dissolves a part or the whole of a catalyst mixture. Examples of such solvents include aromatic hydrocarbons such as benzene, toluene, xylene, and ethylbenzene, halogenated aromatic hydrocarbons such as chlorobenzene, dichlorobenzene and trichlorobenzene, and nitro compounds such as nitrobenzene.

The aromatic solvent used in the present invention is preferably toluene, xylene, or ethylbenzene, and is very preferably toluene.

A solvent having a property of compatibility with water can be mixed into an aromatic solvent in as large an amount of the solvent as not inhibiting the advantage of the present invention. Examples of solvents having a property of compatibility with water include alcohols such as methanol, ethanol and propanol, ketones such as acetone and methyl ethyl ketone, esters such as ethyl acetate and ethyl formate, amides such as dimethylformamide, and sulfoxides such as dimethyl sulfoxide. One or more solvents can further be mixed as required.

The solvent used in the present invention can act especially preferably as long as the solvent has a condition of substantially being noncompatible with water. Examples of solvents often used are aromatic hydrocarbon solvents such as toluene and xylene. Selection of the ratio of a good solvent to a poor solvent for a polyphenylene ether being a polymer obtained by oxidatively polymerizing a phenolic compound may make a polymerization method as a solution polymerization method, and making the ratio of a poor solvent large may make a polymerization method as a precipitation polymerization method in which a polymer is precipitated as particles in the reaction solvent along with the progress of the reaction.

The catalyst (C) used in the present invention is an effective oxidation catalyst for producing a polyphenylene ether by efficiently oxidatively polymerizing a phenolic compound by passing an oxygen-containing gas through a polymerization solution comprising the phenolic compound, an aromatic solvent and the catalyst.

A catalyst (C) usable in the present invention is a catalyst comprising one or more selected from a copper compound, a bromine compound, a diamine compound, a tertiary monoamine compound and a secondary monoamine compound. Particularly a catalyst can be more preferably used which comprises, as essential components, a copper compound, a bromine compound, a diamine compound, a tertiary monoamine compound and a secondary monoamine compound.

A copper compound usable as a component of the catalyst (C) in the present invention is a cuprous compound, a cupric compound or a mixture thereof. Examples of the cuprous compound include cuprous oxide, cuprous chloride, cuprous bromide, cuprous sulfate and cuprous nitrate.

The cupric compound is exemplified by cupric chloride, cupric bromide, cupric sulfate and cupric nitrate. Preferable cuprous and cupric compounds among these are cuprous oxide, cuprous chloride, cupric chloride, cuprous bromide and cupric bromide. These copper salts may be synthesized from the oxides, the carbonates, the hydroxides, etc. and the corresponding halogen or acid, when they are used. For example, cuprous bromide can be obtained by mixing cuprous oxide and hydrogen bromide (a solution thereof). Especially preferable copper compounds are cuprous compounds. These copper compounds may be used singly or in combination of two or more.

Examples of the bromine compounds used as a component of the catalyst (C) according to the present invention are hydrogen bromide, sodium bromide, potassium bromide, tetramethylammonium bromide and tetraethylammonium bromide. These can be used as an aqueous solution or a solution using a suitable solvent. These bromine compounds may be used singly as a component, or may be used in combination of two or more thereof as components. The most preferable combination of a copper compound and a bromine compound is an aqueous solution of cuprous oxide and hydrogen bromide. The use amount of these compounds is not especially limited, but is preferably 2 or more times and 10 or less times the molar amount of the copper atom in terms of the bromine atom, and is in the range of 0.02 to 0.6 mol in terms of the copper atom based on 100 mol of a phenolic compound.

The diamine compounds used as a component of the catalyst (C) according to the present invention are diamine compounds represented by the formula (3) shown below. A preferable diamine compound among the diamine compounds having such structures is N,N'-di-t-butylethylenediamine.

The use amount of a diamine compound is not especially limited, but is usually an amount 0.5 or more times the molar amount usually used of the copper atom, and the upper limit is not critical.

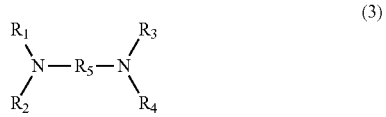

(3)

wherein $R_1$, $R_2$, $R_3$ and $R_4$ are each independently a hydrogen atom, or a straight chain or branched chain alkyl group having 1 to 6 carbon atoms, and all of them are not simultaneously a hydrogen atom; and $R_5$ is a straight chain or methyl-branched alkylene group having 2 to 5 carbon atoms.

The tertiary monoamine compounds used as a component of the catalyst (C) according to the present invention are aliphatic tertiary amines including alicyclic tertiary amines. Examples thereof include trimethylamine, triethylamine, tripropylamine, tributylamine, triisobutylamine, dimethylethylamine, dimethylpropylamine, allyldiethylamine, dimethyl-n-butylamine, diethylisopropylamine and N-methylcyclohexylamine. These tertiary monoamines may be used singly as a component, or may be used in combination of two or more thereof as components. The use amount thereof is not especially limited, but is preferably in the range of 0.1 to 15 mol based on 100 mol of a phenolic compound.

The secondary monoamine compounds used as a component of the catalyst (C) according to the present invention include dimethylamine, diethylamine, di-n-propylamine, diisopropylamine, di-n-butylamine, diisobutylamine, di-t-butylamine, dipentylamines, dihexylamines, dioctylamines, didecylamines, dibenzylamines, methylethylamine, methylpropylamine, methylbutylamine and cyclohexylamine. Examples of N-(substituted or nonsubstituted phenyl)alkanolamines include N-phenylmethanolamine, N-phenylethanolamine, N-phenylpropanolamine, N-(m-methylphenyl)ethanolamine, N-(p-methylphenyl)ethanolamine, N-(2',6'-dimethylphenyl)ethanolamine and N-(p-chlorophenyl)ethanolamine. Examples of N-hydrocarbon-substituted anilines include N-ethylaniline, N-butylaniline, N-methyl-2-methylaniline, N-methyl-2,6-dimethylaniline and diphenylamine, but are not limited to these examples. These secondary monoamine compounds may be used singly as a component, or may be used in combination of two or more thereof as components. The use amount thereof is not especially limited, but is generally in the range of 0.05 mol to 15 mol based on 100 mol of a phenolic compound.

The catalyst (C) according to the present invention comprises all of components of a copper compound, a bromine compound, a diamine compound, a secondary monoamine compound and a tertiary monoamine compound.

The catalyst (C) according to the present invention preferably comprises a copper compound in the range of 0.02 mol to 0.6 mol in terms of the copper atom based on 100 mol of a phenolic compound, a bromine compound in the range of 0.04 mol to 6 mol in terms of the bromine atom based on 100 mol of the phenolic compound, a diamine compound in the range of 0.5 or more times the molar amount of the copper atom, a secondary monoamine compound in the range of 0.1 mol to 15 mol based on 100 mol of the phenolic compound, and a tertiary monoamine compound in the range of 0.05 mol to 15 mol based on 100 mol of the phenolic compound.

The catalyst (C) according to the present invention more preferably comprises a copper compound in the range of 0.03 mol to 0.4 mol in terms of the copper atom based on 100 mol of a phenolic compound, a bromine compound in the range of 0.06 mol to 4 mol in terms of the bromine atom based on 100 mol of the phenolic compound, a diamine compound in the range of 0.6 to 2 times the molar amount of the copper atom in the copper compound, a secondary monoamine compound in the range of 0.2 mol to 5 mol based on 100 mol of the phenolic compound, and a tertiary monoamine compound in the range of 0.1 mol to 5 mol based on 100 mol of the phenolic compound.

A method for preparing a polymerization solution in the method for producing a polyphenylene ether according to the present invention may comprise introducing independently each of components of a phenolic compound (M), an aromatic solvent (A) and a catalyst (C) to a reactor, or dissolving each of a phenolic compound (M) and a catalyst (C) in an aromatic solvent (A) in advance and introducing both the solutions to a reactor.

A preferable method for preparing a polymerization solution in the method for producing a polyphenylene ether according to the present invention is a method of introducing a catalyst (C) dissolved in a part of an aromatic solvent (A) in advance to a reactor and then introducing a phenolic compound (M) dissolved in the rest of the aromatic solvent (A) to the reactor.

In the method for producing a polyphenylene ether according to the present invention, the weights of a phenolic compound (M), an aromatic solvent (A) and a catalyst (C) in a polymerization solution are defined as their weights at the time when the introduction of the phenolic compound (M) and the catalyst (C) to a reactor has been completed in preparing the polymerization solution.

In the present invention, the concentration of a phenolic compound (M) based on 100 parts by mass in total of the phenolic compound (M) and an aromatic solvent (A) is preferably 10 to 25 parts by mass. In the present invention, the concentration of the phenolic compound is more preferably 12 to 23 parts by mass, especially preferably 13 to 21 parts by mass, and very preferably 14 to 20 parts by mass.

In the present invention, the concentration of a catalyst (C) based on 100 parts by mass in total of a phenolic compound (M) and an aromatic solvent (A) is 0.1 to 10% by mass.

In the present invention, in the method for obtaining a polyphenylene ether in which after a phenolic compound (M) is oxidatively polymerized, a chelating agent aqueous solution is mixed into the polymerization solution to terminate the polymerization; a diphenoquinone compound produced as a by-product is disposed, and a metal salt as a polymerization catalyst component, the chelating agent and water, that is, a water phase are separated by a liquid-liquid separation to obtain the polyphenylene ether, before the liquid-liquid separation is carried out, 0.001 to 0.004 part by weight of an ion catalyst (D) is added to the polymerization solution, whereby the productivity is improved; the interface between the water phase and an organic solvent phase when the liquid-liquid separation is carried out is stabilized; and the metal salt as a polymerization catalyst component can effectively be separated from the polyphenylene ether.

The ion catalyst (D) according to the present invention is to stabilize the interface between the water phase and the organic solvent phase.

The ion catalyst (D) according to the present invention is preferably a tetraalkylammonium salt compound represented by formula (4) shown below, or a polyethylene glycol group-containing alkylammonium salt compound represented by formula (5) shown below.

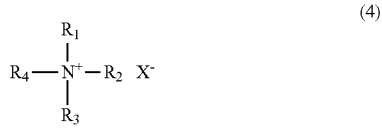

wherein $R_1$, $R_2$, $R_3$ and $R_4$ are each independently a straight chain or branched chain alkyl group having 1 to 22 carbon atoms; and X is a negative ion as a counterion, and is preferably a negative ion selected from $Cl^-$ and $Br^-$.

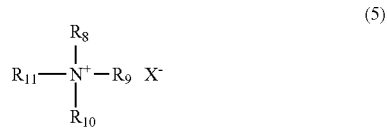

wherein $R_8$ and $R_9$ denote a straight chain or branched chain alkyl group having 1 to 22 carbon atoms; $R_{10}$ may be a group defined as $R_8$ or a group represented by $-(CH_2CH_2O)_n-H$ (where n is an integer of 1 to 40); $R_{11}$ is a group represented by $-(CH_2CH_2O)_n-H$ (where n is an integer of 1 to 40); and X is a negative ion as a counterion, and is preferably a negative ion selected from $Cl^-$ and $Br^-$.

The ion catalyst (D) according to the present invention is especially preferably trioctylmethylammonium chloride.

In the present invention, before the liquid-liquid separation is carried out, 0.001 to 0.004 part by weight of an ion catalyst (D), preferably 0.001 to 0.003 part by weight of an ion catalyst (D), is added to a polymerization solution based on 100 parts by mass in total of parts by mass of a phenolic compound (M) and an aromatic solvent (A) in the polymerization solution.

If the ion catalyst (D) according to the present invention is used in 0.001 part by mass or more based on 100 parts by mass in total of parts by mass of a phenolic compound (M) and an aromatic solvent (A) in the polymerization solution, the liquid-liquid separability is improved. If the ion catalyst (D) according to the present invention is used in 0.004 part by mass or less based on 100 parts by mass in total of parts by mass of a phenolic compound (M) and an aromatic solvent (A) in the polymerization solution, mechanical properties of a polyphenylene ether composition containing the obtained polyphenylene ether as a component is not affected.

In the present invention, if it is before the liquid-liquid separation, the ion catalyst (D) can be added to the polymerization solution at an optional time point.

In the present invention, the ion catalyst (D) is added to the polymerization solution preferably immediately before the liquid-liquid separation.

In the present invention, "immediately before the liquid-liquid separation" means a period between the time when a chelating agent aqueous solution is mixed into a polymerization solution and the time when the liquid-liquid separation is carried out.

In the present invention, if the ion catalyst (D) is added to a polymerization solution between the time when the polymerization solution is prepared and the time when the polymerization is terminated, the polymerization activity is improved, which is more preferable.

In the present invention, the ion catalyst (D) is added to a polymerization solution very preferably at the time when the polymerization solution is prepared.

In the method for producing a polyphenylene ether according to the present invention, the period when an oxygen-containing gas starts to be passed is not especially limited, but passing the oxygen-containing gas is started preferably after one of a phenolic compound (M), an aromatic solvent (A) and a catalyst (C) is introduced to a reactor in preparation of a polymerization solution.

The oxygen-containing gas in the present invention is prepared by mixing oxygen and an optional inert gas such that the oxygen concentration is in the region of the present invention, or uses air, or is prepared by mixing air and an optional inert gas. The inert gas usable is an optional one as long as the inert gas does not largely affect the polymerization reaction. The inert gas is typically nitrogen.

In the present invention, the oxygen-containing gas preferably has an oxygen concentration of 10 to 25% by volume. In the present invention, an oxygen-containing gas is more preferable which is obtained by diluting air with a gas containing nitrogen to an oxygen concentration of 10 to 20% by volume.

The method for producing a polyphenylene ether according to the present invention preferably comprises using an oxygen-containing gas whose oxygen partial pressure is 0.0147 MPa or higher and 0.0883 MPa or lower, and controlling the absolute pressure of the gas phase section of a reactor to 0.098 MPa or higher and lower than 0.392 MPa.

The gas-passing amount of the oxygen-containing gas according to the present invention is not especially limited, but a preferable gas-passing rate is 0.5 Nl/min to 15 Nl/min for 1 kg of a phenolic compound supplied to the polymerization reaction. Although the amount is not critical, too small an amount thereof deteriorates the productivity because the time until a desired molecular weight is reached becomes very long. By contrast, too large an amount thereof generates problems of the excessive upsizing of a facility and the increase in an exhaust gas amount, damaging profitability.

With respect to the temperature of the polymerization solution according to the present invention, since too low a temperature thereof hardly progresses the reaction, and too high a temperature thereof deactivates the catalyst in some cases, the reaction is carried out in the range of 0 to 80° C., and preferably in the range of 10 to 60° C.

The method for terminating the polymerization reaction according to the present invention is not especially limited.

In the present invention, a method is preferably employed in which passing an oxygen-containing gas is stopped, and an acid such as hydrochloric acid or acetic acid, or a chelating agent aqueous solution such as ethylenediaminetetraacetic acid (EDTA) and its salts and nitrilotriacetic acid and its salts is added to a reaction liquid to deactivate the catalyst to terminate the polymerization.

In the present invention, a method for disposing a diphenoquinone compound produced as a by-product during the polymerization is not limited.

In the present invention, subjecting the diphenoquinone compound produced as a by-product during the polymerization to quinone-coupling treatment, or a method of reductively removing it is preferably employed.

In the present invention, quinone-coupling treatment in which a diphenoquinone compound and a polyphenylene ether are allowed to react to dispose the diphenoquinone compound can be employed as a more preferable method.

In the present invention, quinone-coupling treatment is very preferable in which after a chelating agent aqueous solution is mixed into a polymerization solution to terminate the polymerization, the temperature of the polymerization solution is set at 60 to 120° C., and this temperature is maintained for about 20 min to 150 min.

In the present invention, a method of separating a polyphenylene ether from a polymerization solution is not limited.

In the present invention, a method for separating a polyphenylene ether is preferably employed in which the polymerization solution is subjected to precipitation into a solvent such as methanol, which does not dissolve the polyphenylene ether, and the resulting precipitate is filtered and dried to obtain the polyphenylene ether.

EXAMPLES

Hereinafter, the present invention will be described by way of Examples, but the present invention is not limited to the following Examples.

Common procedures in Examples and Comparative Examples will be described hereinafter.
(Common Procedures)

In Examples according to the present invention and Comparative Examples, a reactor used was a 10-L autoclave-type jacket-equipped reactor, having a cylindrical shape having an inner diameter of 16 cm, in which in the bottom section of the reactor, a sparger to introduce an oxygen-containing gas, stirring turbine blades and a discharge valve for sampling were installed; in the side section of the reactor, a baffle, a temperature regulator and a peephole to confirm the inner condition were installed; in the upper section of the reactor, an introduction port of polymerization solution components was provided; and in a vent gas line, a control valve-equipped reflux cooler equipped with a decanter to separate a condensate was provided.

Examples according to the present invention and Comparative Examples used 2,6-dimethylphenol as a phenolic compound (M).

Examples according to the present invention and Comparative Examples used toluene as an aromatic solvent (A).

The prescribed addition amount of each component of all catalysts (C) used in Examples according to the present invention and Comparative Examples was set such that: for 1,000 g of 2,6-dimethylphenol, cuprous oxide was 1.288 g; a 47% aqueous solution of hydrogen bromide was 7.749 g; N,N'-di-t-butylethylenediamine was 3.104 g; dimethyl-n-butylamine was 38.11 g; and di-n-butylamine was 15.03 g.

Examples according to the present invention and Comparative Examples used trioctylmethylammonium chloride as an ion catalyst (D).

Examples according to the present invention and Comparative Examples used an oxygen-containing gas to be passed whose oxygen concentration was 9%.

In Examples according to the present invention and Comparative Examples, the gas-passing rate of the oxygen-containing gas was set at 4 Nl/min·kg for 1 kg of 2,6-dimethylphenol in a polymerization solution.

In Examples according to the present invention and Comparative Examples, the control valve downstream of the reflux cooler was regulated to control the absolute pressure of the reactor gas phase section to 0.25 MPa.

In Examples according to the present invention and Comparative Examples, first, a polymerization solution composed of toluene, 2,6-dimethylphenol, a catalyst (C) and a catalyst (D) in amounts designated in Examples and Comparative Examples was prepared, introduced to the introduction port of the reactor; and the temperature of the polymerization solution was regulated to 40° C. Until the oxidative polymerization had completed, the temperature of the polymerization solution was regulated to 40° C.

In Examples according to the present invention and Comparative Examples, the oxidative polymerization was carried out by stirring the polymerization solution and introducing an oxygen-containing gas from the sparger. The time point when the oxygen-containing gas started to be introduced was defined as a polymerization starting time.

In Examples according to the present invention and Comparative Examples, an aqueous solution of EDTA tetrasodium salt was added from the introduction port, and the polymerization solution was stirred for 10 min and the oxidative polymerization was terminated.

In Examples according to the present invention and Comparative Examples, after the polymerization termination, by regulating the polymerization solution for 60 min at 80° C., the quinone-coupling treatment to react diphenoquinone and polyphenylene ether was carried out to dispose the diphenoquinone produced as a by-product during the polymerization.

In Examples according to the present invention and Comparative Examples, after a water phase was separated from the polymerization solution, the polymerization solution was dropped in methanol having the same volume to precipitate a polyphenylene ether (after the quinone-coupling treatment).

In Examples according to the present invention and Comparative Examples, immediately after the oxidative polymerization was terminated, a part of the polymerization solution was sampled. Hydroquinone was added to the polymerization solution sample; after a water phase was separated, the polymerization solution sample was dropped in methanol having the same volume to precipitate a polyphenylene ether (after the polymerization termination).

In Examples according to the present invention and Comparative Examples, the precipitated polyphenylene ether was further thrice washed with methanol having the same volume, and filtered and then vacuum dried at 145° C.

In Examples according to the present invention and Comparative Examples, a chloroform solution of a concentration of the polyphenylene ether of 0.5 g/dl was prepared, and the ηsp/c thereof was measured using an Ubbelohde viscometer.

In Examples according to the present invention and Comparative Examples, the obtained polyphenylene ether (after the quinone-coupling treatment) and the other compositional components were melted and kneaded using a ZSK-25 type twin-screw extruder to obtain a polyphenylene ether composition.

The compositional components used in Examples according to the present invention and Comparative Examples were as follows.

Polyphenylene ether (PPE): a polyphenylene ether (after the quinone-coupling treatment) obtained by each of Examples and Comparative Examples.

High-impact polystyrene (HIPS): in terms of 0.5% toluene solution, a high-impact polystyrene whose value of ηsp/c measured at 30° C. using an Ubbelohde viscometer was 0.73 dl/g; whose rubber concentration was 7.6% by mass; whose average rubber particle diameter measured by the call counter method was 1.0 μm.

Hydrogenated block copolymer (HTR): A hydrogenated material of a SBS block copolymer composed of a styrene polymer block (S block) having a number-average molecular weight of about 23,000 and a butadiene block (B block) having about 35% of a 1,2-vinyl structure.

Condensed phosphate flame retardant (CR): CR-741 (trade name), made by Daihachi Chemical Industry Co., Ltd.

Polyethylene (PE): a low-density polyethylene whose MFR measured at 190° C. at a load of 2.16 kg according to ASTM D1238 was 21 g/10 min.

In Examples according to the present invention and Comparative Examples, the cylinder temperature of the twin-screw extruder described above was regulated to 310° C.; respective prescribed amounts of the PPE, HIPS, HTR and PE were dry blended, and quantitatively supplied collectively from a main supply port; and simultaneously, the CR heated and liquid was supplied in a prescribed amount from a side supply port using a metering pump; and the mixture was melted and kneaded to obtain a polyphenylene ether composition. The extrusion rate was set at 12 kg/h.

In Examples according to the present invention and Comparative Examples, the component composition of the polyphenylene ether composition was made PPE:HIPS:HTR:PE:CR=56:24:2:2:16.

In Examples according to the present invention and Comparative Examples, the obtained polyphenylene ether composition was measured for the following physical properties.

Notched Izod impact strength: The notched Izod impact strength was measured according to ASTM D256. Specimens were fabricated using an injection molding machine made by Toshiba Machine Co., Ltd. with the cylinder temperature regulated to 260° C.

Chemical resistance: A tensile strength (TS-Blank) of the specimen of ⅛ thickness before subjected to a chemical treatment was measured according to ASTM D638. A tensile strength (TS-S) of another specimen after the chemical treatment, in which after the another specimen was attached and adjusted on a warping tool so that the surface strain became 1%, the another specimen was immersed in a mixed liquid of isopropanol/cyclohexane (60/40) for 30 min, and then measured for the tensile strength, was obtained. (TS-S)/(TS-Blank) was defined as a retention ratio of chemical resistance.

Color tone: The color tone of a specimen was determined visually.

Example 1

A polymerization solution constituted of 1.26 kg of 2,6-dimethylphenol, 5.74 kg of toluene, a prescribed amount set in the above-mentioned common procedures of a catalyst (C), and 250 mg of an ion catalyst (D) was prepared; introduced in a reactor; a control valve downstream of a reflux cooler was regulated; the liquid temperature was regulated to 40° C.; the polymerization solution was introduced in a reactor; a control valve downstream of a reflux cooler was regulated; the liquid temperature was regulated to 40° C.; and an oxygen-containing gas was passed from a sparger, thus oxidatively polymerizing 2,6-dimethylphenol. An aqueous solution of EDTA tetrasodium salt was mixed into the polymerization solution 150 min after the start of the oxidative polymerization, and stirred for 10 min and the oxidative polymerization was terminated. At this time, a part of the polymerization solution was taken out to sample a polyphenylene ether (after the polymerization termination). Thereafter, diphenoquinone was disposed by the quinone-coupling in which the polymerization solution was heated to 80° C. and stirred for 60 min. The polymerization solution was transferred to a separation funnel, and 1 kg of water was added thereto; and thereafter, an organic phase containing the polyphenylene ether and a water phase containing the catalysts were separated. At this time, there was no bubbling in the interface between the organic phase and the water phase, and thus the phases were easily separated. Further, 1 kg of water was added to the organic phase, which was then stirred, and thereafter an organic phase and a water phase were separated; and the above-mentioned common procedures were carried out to obtain a polyphenylene ether (after the quinone-coupling treatment).

The ηsp/c of the polyphenylene ether (after the polymerization termination) and the ηsp/c of the polyphenylene ether (after the quinone-coupling treatment) were measured.

According to the above-mentioned common procedures, the polyphenylene ether (after the quinone-coupling treatment) and other compositional components were melted and kneaded to prepare a polyphenylene ether composition, which was measured for the Izod impact strength, the retention ratio of chemical resistance and the color tone.

The measurement results are shown collectively in Table 1.

Example 2

A polymerization solution constituted of 1.26 kg of 2,6-dimethylphenol, 5.74 kg of toluene, a prescribed amount set in the above-mentioned common procedures of a catalyst (C), and 150 mg of an ion catalyst (D) was prepared, and the same procedures as in Example 1 were carried out to obtain a polyphenylene ether (after the polymerization termination) and a polyphenylene ether (after the quinone-coupling treatment). There occurred no bubbling in the interface between an organic phase and a water phase when the phases were separated, and thus the phases were easily separated. The ηsp/c was measured as in Example 1. A polyphenylene ether composition was prepared as in Example 1, and measured for the Izod impact strength, the retention ratio of chemical resistance and the color tone.

The measurement results are shown collectively in Table 1.

Comparative Example 1

A polymerization solution constituted of 1.26 kg of 2,6-dimethylphenol, 5.74 kg of toluene, and a prescribed amount set in the above-mentioned common procedures of a catalyst (C) was prepared, and the same procedures as in Example 1 were carried out to obtain a polyphenylene ether (after the polymerization termination) and a polyphenylene ether (after the quinone-coupling treatment). The polymerization solution was transferred to a separation funnel; 1 kg of water was added thereto, and thereafter, when an organic phase and a water phase were separated, there occurred bubbling in the interface between the organic phase and the water phase, and thus the separation was difficult. About 100 g of an interface portion was discarded. The ηsp/c was measured as in Example 1. A polyphenylene ether composition was prepared as in Example 1, and measured for the Izod impact strength, the retention ratio of chemical resistance and the color tone.

The measurement results are shown collectively in Table 2.

The obtained polyphenylene ether composition exhibited a color tone of reddish brown.

Comparative Example 2

A polymerization solution constituted of 1.26 kg of 2,6-dimethylphenol, 5.74 kg of toluene, a prescribed amount set in the above-mentioned common procedures of a catalyst (C), and 450 mg of an ion catalyst (D) was prepared, and the same procedures as in Example 1 were carried out to obtain a polyphenylene ether (after the polymerization termination) and a polyphenylene ether (after the quinone-coupling treatment). When an organic phase and a water phase were separated, there occurred no bubbling in the interface between the phases, and thus the phases were easily separated. The ηsp/c was measured as in Example 1. A polyphenylene ether composition was prepared as in Example 1, and measured for the Izod impact strength, the retention ratio of chemical resistance and the color tone.

The measurement results are shown collectively in Table 2.

The obtained polyphenylene ether composition was inferior in the Izod impact strength and the retention ratio of chemical resistance to the polyphenylene ether compositions in Examples.

Comparative Example 3

A polymerization solution constituted of 1.26 kg of 2,6-dimethylphenol, 5.74 kg of toluene, a prescribed amount set in the above-mentioned common procedures of a catalyst (C), and 50 mg of an ion catalyst (D) was prepared, and the same procedures as in Example 1 were carried out to obtain a polyphenylene ether (after the polymerization termination) and a polyphenylene ether (after the quinone-coupling treatment). The polymerization solution was transferred to a separation funnel; 1 kg of water was added thereto, and thereafter, when an organic phase and a water phase were separated, there occurred bubbling in the interface between the organic phase and the water phase, and thus the separation was difficult. About 50 g of an interface portion was discarded. The $\eta sp/c$ was measured as in Example 1. A polyphenylene ether composition was prepared as in Example 1, and measured for the Izod impact strength, the retention ratio of chemical resistance and the color tone.

The measurement results are shown collectively in Table 2.

The obtained polyphenylene ether composition exhibited a color tone of light brown.

Example 3

A polymerization solution constituted of 1.47 kg of 2,6-dimethylphenol, 5.53 kg of toluene, an amount 1.17 times a prescribed amount set in the above-mentioned common procedures of a catalyst (C), and 250 mg of an ion catalyst (D) was prepared, and the same procedures as in Example 1 were carried out to obtain a polyphenylene ether (after the polymerization termination) and a polyphenylene ether (after the quinone-coupling treatment). When an organic phase and a water phase were separated, there occurred no bubbling in the interface between the phases, and thus the phases were easily separated. The $\eta sp/c$ was measured as in Example 1. A polyphenylene ether composition was prepared as in Example 1, and measured for the Izod impact strength, the retention ratio of chemical resistance and the color tone.

The measurement results are shown collectively in Table 1.

Example 4

A polymerization solution constituted of 0.77 kg of 2,6-dimethylphenol, 6.23 kg of toluene, an amount 0.61 time a prescribed amount set in the above-mentioned common procedures of a catalyst (C), and 100 mg of an ion catalyst (D) was prepared, and the same procedures as in Example 1 were carried out to obtain a polyphenylene ether (after the polymerization termination) and a polyphenylene ether (after the quinone-coupling treatment). When an organic phase and a water phase were separated, there occurred no bubbling in the interface between the phases, and thus the phases were easily separated. The $\eta sp/c$ was measured as in Example 1. A polyphenylene ether composition was prepared as in Example 1, and measured for the Izod impact strength, the retention ratio of chemical resistance and the color tone.

The measurement results are shown collectively in Table 1.

Comparative Example 4

A polymerization solution constituted of 1.47 kg of 2,6-dimethylphenol, 5.53 kg of toluene, an amount 1.17 times a prescribed amount set in the above-mentioned common procedures of a catalyst (C), and 400 mg of an ion catalyst (D) was prepared, and the same procedures as in Example 1 were carried out to obtain a polyphenylene ether (after the polymerization termination) and a polyphenylene ether (after the quinone-coupling treatment). When an organic phase and a water phase were separated, there occurred no bubbling in the interface between the phases, and thus the phases were easily separated. The $\eta sp/c$ was measured as in Example 1. A polyphenylene ether composition was prepared as in Example 1, and measured for the Izod impact strength, the retention ratio of chemical resistance and the color tone.

The measurement results are shown collectively in Table 2.

The obtained polyphenylene ether composition was inferior in the Izod impact strength and the retention ratio of chemical resistance to the polyphenylene ether compositions in Examples.

Comparative Example 5

A polymerization solution constituted of 0.77 kg of 2,6-dimethylphenol, 6.23 kg of toluene, an amount 0.61 time a prescribed amount set in the above-mentioned common procedures of a catalyst (C), and 500 mg of an ion catalyst (D) was prepared, and the same procedures as in Example 1 were carried out to obtain a polyphenylene ether (after the polymerization termination) and a polyphenylene ether (after the quinone-coupling treatment). When an organic phase and a water phase were separated, there occurred no bubbling in the interface between the phases, and thus the phases were easily separated. The $\eta sp/c$ was measured as in Example 1. A polyphenylene ether composition was prepared as in Example 1, and measured for the Izod impact strength, the retention ratio of chemical resistance and the color tone.

The measurement results are shown collectively in Table 2.

The obtained polyphenylene ether composition was inferior in the Izod impact strength and the retention ratio of chemical resistance to the polyphenylene ether compositions in Examples.

Example 5

A polymerization solution constituted of 1.26 kg of 2,6-dimethylphenol, 5.74 kg of toluene, and a prescribed amount set in the above-mentioned common procedures of a catalyst (C) was prepared, and introduced in a reactor; a control valve downstream of a reflux cooler was regulated; the liquid temperature was regulated to 40° C.; and an oxygen-containing gas was passed from a sparger, thus oxidatively polymerizing 2,6-dimethylphenol. An aqueous solution of EDTA tetrasodium salt was mixed into the polymerization solution 150 min after the start of the oxidative polymerization, and stirred for 10 min and the oxidative polymerization was terminated. At this time, a part of the polymerization solution was taken out to sample a polyphenylene ether (after the polymerization termination). Thereafter, diphenoquinone was disposed by the quinone-coupling in which the polymerization solution was heated to 80° C. and stirred for 60 min. 100 mg of trioctylmethylammonium chloride (an ion catalyst (D)) was added to the polymerization solution; the polymerization solution was transferred to a separation funnel, and 1 kg of water was added thereto; and thereafter, an organic phase containing the polyphenylene ether and a water phase containing the catalysts were separated. At this time, there was no bubbling in the interface between the organic phase and the water phase, and thus the phases were easily separated. Further, 1 kg of water was added to the organic phase, which was then stirred, and thereafter an organic phase and a water phase were separated; and the above-mentioned common procedures were carried out to obtain a polyphenylene ether (after the quinone-coupling treatment).

The ηsp/c of the polyphenylene ether (after the polymerization termination) and the ηsp/c of the polyphenylene ether (after the quinone-coupling treatment) were measured.

According to the above-mentioned common procedures, the polyphenylene ether (after the quinone-coupling treatment) and other compositional components were melted and kneaded to prepare a polyphenylene ether composition, which was measured for the Izod impact strength, the retention ratio of chemical resistance and the color tone.

The measurement results are shown collectively in Table 1.

Example 6

A polymerization solution constituted of 0.77 kg of 2,6-dimethylphenol, 6.23 kg of toluene, and an amount 0.61 time a prescribed amount set in the above-mentioned common procedures of a catalyst (C) was prepared, and introduced in a reactor, and a polyphenylene ether (after the polymerization termination) was obtained by the same procedures as in Example 5. After diphenoquinone was disposed, 200 mg of trioctylmethylammonium chloride (an ion catalyst (D)) was added to the polymerization solution, and a polyphenylene ether (after the quinone-coupling treatment) was obtained by the same procedures as in Examples 5. When an organic phase and a water phase were separated, there was no bubbling in the interface between the phases, and thus the phases were easily separated.

The ηsp/c of the polyphenylene ether (after the polymerization termination) and the ηsp/c of the polyphenylene ether (after the quinone-coupling treatment) were measured.

According to the above-mentioned common procedures, the polyphenylene ether (after the quinone-coupling treatment) and other compositional components were melted and kneaded to prepare a polyphenylene ether composition, which was measured for the Izod impact strength, the retention ratio of chemical resistance and the color tone.

The measurement results are shown collectively in Table 1.

Comparative Example 6

A polymerization solution constituted of 1.26 kg of 2,6-dimethylphenol, 5.74 kg of toluene, and a prescribed amount set in the above-mentioned common procedures of a catalyst (C) was prepared, and introduced in a reactor, and a polyphenylene ether (after the polymerization termination) was obtained by the same procedures as in Example 5. After diphenoquinone was disposed, 500 mg of trioctylmethylammonium chloride (an ion catalyst (D)) was added to the polymerization solution, and a polyphenylene ether (after the quinone-coupling treatment) was obtained by the same procedures as in Examples 5. When an organic phase and a water phase were separated, there was no bubbling in the interface between the phases, and thus the phases were easily separated.

The ηsp/c of the polyphenylene ether (after the polymerization termination) and the ηsp/c of the polyphenylene ether (after the quinone-coupling treatment) were measured.

According to the above-mentioned common procedures, the polyphenylene ether (after the quinone-coupling treatment) and other compositional components were melted and kneaded to prepare a polyphenylene ether composition, which was measured for the Izod impact strength, the retention ratio of chemical resistance and the color tone.

The measurement results are shown collectively in Table 2.

The obtained polyphenylene ether composition was inferior in the Izod impact strength and the retention ratio of chemical resistance to the polyphenylene ether compositions in Examples.

Comparative Example 7

A polymerization solution constituted of 1.26 kg of 2,6-dimethylphenol, 5.74 kg of toluene, a prescribed amount set in the above-mentioned common procedures of a catalyst (C), and 300 mg of trioctylmethylammonium chloride (an ion catalyst (D)) was prepared, and a polyphenylene ether (after the polymerization termination) and a polyphenylene ether (after the quinone-coupling treatment) were obtained by the same procedures as in Example 1.

When an organic phase and a water phase were separated, there was no bubbling in the interface between the phases, and thus the phases were easily separated. The ηsp/c was measured as in Example 1. A polyphenylene ether composition was prepared as in Example 1, and measured for the Izod impact strength, the retention ratio of chemical resistance and the color tone.

The measurement results are shown collectively in Table 2.

The obtained polyphenylene ether composition was inferior in the Izod impact strength and the retention ratio of chemical resistance to the polyphenylene ether compositions in Examples.

Comparative Example 8

A polymerization solution constituted of 1.47 kg of 2,6-dimethylphenol, 5.53 kg of toluene, and an amount 0.61 time a prescribed amount set in the above-mentioned common procedures of a catalyst (C) was prepared, and introduced in a reactor, and a polyphenylene ether (after the polymerization termination) was obtained by the same procedures as in Example 5. After diphenoquinone was disposed, 320 mg of trioctylmethylammonium chloride (an ion catalyst (D)) was added to the polymerization solution, and a polyphenylene ether (after the quinone-coupling treatment) was obtained by the same procedures as in Examples 5. When an organic phase and a water phase were separated, there was no bubbling in the interface between the phases, and thus the phases were easily separated.

The ηsp/c of the polyphenylene ether (after the polymerization termination) and the ηsp/c of the polyphenylene ether (after the quinone-coupling treatment) were measured.

According to the above-mentioned common procedures, the polyphenylene ether (after the quinone-coupling treatment) and other compositional components were melted and kneaded to prepare a polyphenylene ether composition, which was measured for the Izod impact strength, the retention ratio of chemical resistance and the color tone.

The measurement results are shown collectively in Table 2.

The obtained polyphenylene ether composition was inferior in the Izod impact strength and the retention ratio of chemical resistance to the polyphenylene ether compositions in Examples.

TABLE 1

|  | Example 1 | Example 2 | Example 3 | Example 4 | Example 5 | Example 6 |
| --- | --- | --- | --- | --- | --- | --- |
| M (g) | 1260 | 1260 | 1470 | 770 | 1260 | 770 |
| A (g) | 5740 | 5740 | 5530 | 6230 | 5740 | 6230 |
| M + A (g) | 7000 | 7000 | 7000 | 7000 | 7000 | 7000 |
| M/(M + A) | 0.18 | 0.18 | 0.21 | 0.11 | 0.18 | 0.11 |
| Addition Amount of D at the Start of Polymerization (mg) | 250 | 150 | 250 | 100 | | |

TABLE 1-continued

|  | Example 1 | Example 2 | Example 3 | Example 4 | Example 5 | Example 6 |
|---|---|---|---|---|---|---|
| Addition Amount of D at the End of Polymerization (mg) |  |  |  |  | 100 | 200 |
| Addition Ratio of D (vs 100 wp of M + A) | 0.0036 | 0.0021 | 0.0036 | 0.0014 | 0.0014 | 0.0029 |
| Addition Amount of D (ppm vs A) | 44 | 26 | 45 | 16 | 17 | 32 |
| Liquid-Liquid Separability | Good | Good | Good | Good | Good | Good |
| ηsp/c (after polymerization termination), dl/g | 0.76 | 0.75 | 0.75 | 0.75 | 0.74 | 0.74 |
| ηsp/c (after quinone-coupling treatment) | 0.54 | 0.54 | 0.54 | 0.54 | 0.53 | 0.53 |
| Izod Impact Strength, kg · cm/cm | 19 | 18 | 17 | 17 | 19 | 18 |
| Retention Ratio of Chemical Resistance, % | 55 | 60 | 55 | 60 | 60 | 55 |
| Color Tone | Cream color | Cream color | Cream color | Cream color | Cream color | Cream color |

TABLE 2

|  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| M | 1260 | 1260 | 1260 | 1470 | 770 | 1260 | 1260 | 1470 |
| A | 5740 | 5740 | 5740 | 5530 | 6230 | 5740 | 5740 | 5530 |
| M + A | 7000 | 7000 | 7000 | 7000 | 7000 | 7000 | 7000 | 7000 |
| M/(M + A) | 0.18 | 0.18 | 0.18 | 0.21 | 0.11 | 0.18 | 0.18 | 0.21 |
| Addition Amount of D at the Start of Polymerization | 0 | 450 | 50 | 400 | 500 |  | 300 |  |
| Addition Amount of D at the End of Polymerization |  |  |  |  |  | 500 |  | 320 |
| Addition Ratio of D (vs 100 wp of M + A) | 0.0000 | 0.0064 | 0.0007 | 0.0057 | 0.0071 | 0.0071 | 0.0043 | 0.0046 |
| Addition Amount of D (ppm vs A) | 0 | 78 | 9 | 72 | 80 | 87 | 52 | 58 |
| Liquid-Liquid Separability | Poor | Good | Poor | Good | Good | Good | Good | Good |
| ηsp/c (after polymerization termination), dl/g | 0.75 | 0.77 | 0.73 | 0.76 | 0.77 | 0.75 | 0.75 | 0.73 |
| ηsp/c (after quinone-coupling treatment) | 0.52 | 0.55 | 0.53 | 0.56 | 0.54 | 0.55 | 0.53 | 0.53 |
| Izod Impact Strength, kg · cm/cm | 17 | 12 | 18 | 13 | 12 | 12 | 14 | 15 |
| Retention Ratio of Chemical Resistance, % | 55 | 30 | 50 | 25 | 20 | 35 | 40 | 40 |
| Color Tone | Light brown | Cream color | Light brown | Cream color | Cream color | Cream color | Cream color | Cream color |

INDUSTRIAL APPLICABILITY

The present invention can separate completely and efficiently a metal salt being a polymerization catalyst component from a polyphenylene ether in the oxidative polymerization of a phenolic compound, and improves the production efficiency and yield more than conventional methods.

The invention claimed is:

1. A method for separating a metal salt as a polymerization catalyst component from a polymerization solution of a polyphenylene ether comprising:

preparing a polymerization solution comprising 100 parts by mass in total of 10 to 25 parts by mass of a phenolic compound (M) and 75 to 90 parts by mass of an aromatic solvent (A), and 0.1 to 10 parts by mass of a catalyst (C) comprising a metal salt as a component;

passing an oxygen-containing gas through the polymerization solution to oxidatively polymerize the phenolic compound (M);

mixing a chelating agent aqueous solution with the polymerization solution to terminate the polymerization;

disposing a diphenoquinone compound produced as a by-product to obtain the polyphenylene ether by quinone coupling; and thereafter, subjecting the polymerization solution to a liquid-liquid separation to separate the metal salt, the chelating agent and water as a water phase, wherein 0.001 to 0.004 part by weight of an ion catalyst (D) is added to the polymerization solution when the polymerization solution is prepared.

2. The method according to claim 1, wherein the ion catalyst (D) is added in an amount of 0.001 to 0.003 part by mass.

3. The method according to claim 1, wherein the ion catalyst (D) is a tetraalkylammonium salt compound represented by formula (4) shown below, or a polyethylene glycol group-containing alkylammonium salt compound represented by formula (5) shown below:

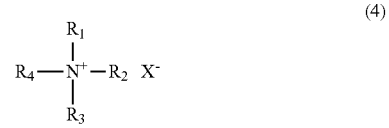

(4)

wherein $R_1$, $R_2$, $R_3$ and $R_4$ are each independently a straight chain or branched chain alkyl group having 1 to 22 carbon atoms; and X is a negative ion as a counterion;

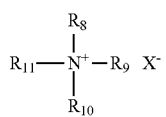 (5)

wherein $R_8$ and $R_9$ denote a straight chain or branched chain alkyl group having 1 to 22 carbon atoms; $R_{10}$ is a group defined as $R_8$, or a group represented by —$(CH_2CH_2O)_n$—H (where n is an integer of 1 to 40); R11 is a group represented by —$(CH_2CH_2O)_n$—H (where n is an integer of 1 to 40); and X is a negative ion as a counterion.

4. The method according to claim 1, wherein the ion catalyst (D) is trioctylmethylammonium chloride.

5. The method according to claim 1, wherein the oxygen-containing gas is an oxygen-containing gas having an oxygen concentration of 10 to 25% by volume.

6. The method according to claim 1, further comprising using an oxygen-containing gas having an oxygen partial pressure of 0.0147 MPa or higher and 0.0883 MPa or lower, and controlling an absolute pressure of a reactor gas phase section to 0.098 MPa or higher and lower than 0.392 MPa.

* * * * *